United States Patent [19]
Kitai

[11] 3,762,295
[45] Oct. 2, 1973

[54] CAMERA WITH EXCHANGEABLE LENS

[75] Inventor: Kiyoshi Kitai, Shinjuku-ku, Tokyo, Japan

[73] Assignee: Kabushiki Kaisha Hattori Tokeiten, Tokyo, Japan

[22] Filed: Apr. 9, 1971

[21] Appl. No.: 132,835

[52] U.S. Cl. ............... 95/53 EA, 95/53 E, 95/64 B, 95/10 CT
[51] Int. Cl. ............................................. G03b 9/62
[58] Field of Search .............. 95/53 EA, 53 E, 10 C, 95/64 B

[56] References Cited
UNITED STATES PATENTS

| | | | |
|---|---|---|---|
| 3,641,892 | 2/1972 | Strehle | 95/10 C |
| 3,678,823 | 7/1972 | Sato | 95/10 CT |
| R26,681 | 10/1969 | Kiper | 95/10 C |
| 3,465,661 | 9/1969 | Hahn | 95/64 B X |
| 3,536,408 | 10/1970 | Norwood | 95/10 C X |
| 3,071,057 | 1/1963 | Gebele | 95/64 B |
| 3,521,543 | 7/1970 | Singer | 95/53 EA |
| 3,526,108 | 9/1970 | Fahlenberg | 95/53 EA |
| 3,563,153 | 2/1971 | Watanabe | 95/10 C X |

*Primary Examiner*—Samuel S. Matthews
*Assistant Examiner*—Michael D. Harris
*Attorney*—Robert E. Burns and Emmanuel J. Lobato

[57] ABSTRACT

A camera body having a mount for removably mounting different lens units thereon. The lens units have a built-in shutter and a built-in circuit for opening and closing the shutter. The camera body has a built-in circuit electrically connected to the lens unit circuit when it is mounted on the camera for taking an exposure. The circuit in the camera has the major electrical components such as a built-in light meter and power source for controlling the operation of opening and closing the shutter. The camera body and the lens unit each have a set of electrical contacts connected at different points to the circuits therein and provided with respective spherical contact surfaces for making electrical connection between the circuits automatically when the lens unit is attached or mounted im position on the camera body for taking a photographic exposure.

3 Claims, 3 Drawing Figures

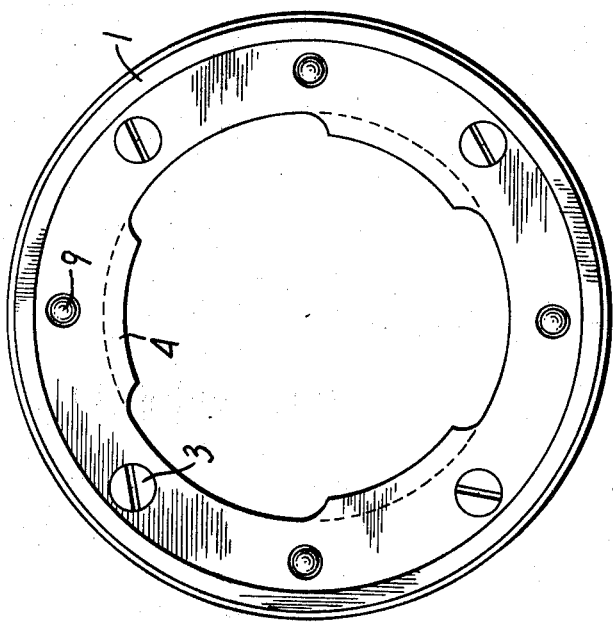
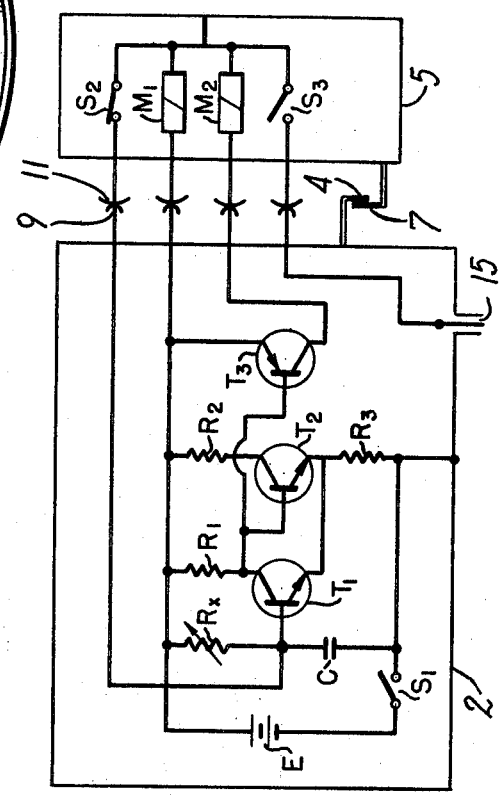
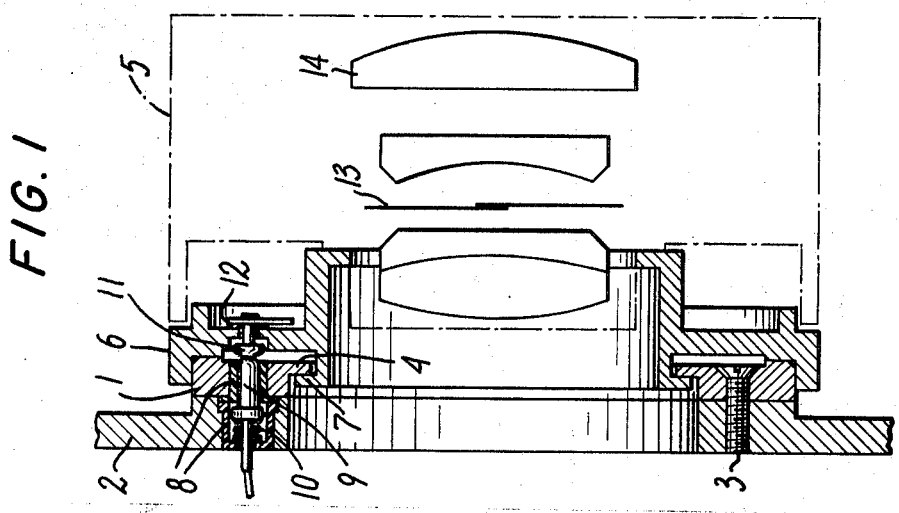

CAMERA WITH EXCHANGEABLE LENS

BACKGROUND OF THE INVENTION

This invention relates generally to photographic cameras and more particularly to cameras with interchangeable lens units.

PRIOR ART

Cameras with interchangeable lens units are known in which an electric shutter is provided in the lens units. In some of these units the delay circuitry and power source for controlling the electric shutter are sometimes mounted in the lens units. As a consequence the lens unit is quite large and the manufacturing costs thereof are more costly. Because of this cameras have been constructed in which the electric power source and delay devices are mounted on the side of the camera body so that connection can be made thereto to circuitry in the lens unit. However, the connection of cables and circuitry in exchanging the lens unit has presented a problem. Moreover, the electrical connections made in these known cameras are not always reliable.

SUMMARY OF THE INVENTION

It is a principal object of the present invention to provide a camera with interchangeable lens units in which electrical connection between circuitry in the lens unit and within the camera body is made automatically as the lens unit is mounted on the camera body.

Another object of the present invention is to provide electrical contacts for effecting connection between the lens unit and the camera body circuitry in a positive manner insuring proper electrical connections in the circuitry controlling the shutter.

In accordance with the invention a camera is provided having a camera body provided with a lens mount for removably mounting interchangeable lenses thereon. A lens unit according to the invention is removeably mounted on the camera body. The lens unit has the lenses, and electrically controlled shutter therein and built-in electrical circuit for opening and closing the shutter in the lens unit. The camera body has a built-in circuit coacting with the circuit in the lens unit for controllably opening and closing the shutter. The circuitry in the camera body includes the major components of the circuit.

Each built-in circuit has a set of electrical contacts connected at different points and disposed to effect electrical connection between the two circuits when the lens unit is mounted on the body. The lens unit is bayonet-mounted and when connected to the camera body its electrical contacts are in position to contact the contacts on the camera body. The camera body contacts are biased actively in a direction outwardly of the camera body so that hemispherical contact surfaces thereof positively engage hemispherical contact surfaces on the contacts of the lens unit. The lens unit hemispherical contact surfaces have a greater area and lesser curvature than the hemispherical contact surfaces of the electrical contacts on the camera body.

BRIEF DESCRIPTION OF THE DRAWINGS

Other objects and advantages of the camera with interchangeable lens units in accordance with the invention will appear from the following description of an example of the invention and novel features thereof will be particularly pointed out in the following specification, appended claims and drawing in which:

FIG. 1 is a diagrammatic cross section view of a lens unit according to the invention;

FIG. 2 is a fragmentary front end view of a camera mount for mounting a lens unit on a camera body according to the invention; and FIG. 3 is a diagrammatic illustration of a camera with a lens unit mounted thereon, illustrating symmatically circuitry for controlling a lens shutter to an open nnd closed position according to the invention.

DESCRIPTION OF THE PREFERRED EMBODIMENT

In the drawings a lens mounting ring plate 1 is mounted on a camera body 2 with angularly spaced screws 3. The mounting plate 1 has angularly disposed flanges 4 about an opening for removeably bayonet-mounting a lens unit 5 on the camera body.

The lens unit 5 has a ring plate 6 that has angularly disposed flanges 7. The construction of the lens unit is for a bayonet-mounted stabbed into the camera body with the flanges on the lens unit disposed in the spaces between those of the camera body mount and by angular relative rotation thereof the flanges 4, 7 of the lens unit and the camera body are disposed in opposed positions so that the lens unit is removeably mounted on the camera body as illustrated in FIGS. 1 and 2.

The lens unit 5 and the camera body 2 make provision for electrically connecting automatically built-in circuits therein for controlling the opening and closing of a shutter in the lens unit as hereinafter described. The camera body 2 has a built-in circuit comprising a power source E and three transistors T1, T2, T3 interconnected as shown with two having their collectors connected to the positive terminal of the power source through collector resistors R1, R2 and to an electromagnet M1 which is in the lens unit 5. These same two transistors have their emitters connected to the negative terminal of the power source through an emitter resistor R3 in series with a generally open power switch S1 and are grounded to the camera body 2.

The base of the first transistor T1 is connected to a junction intermediate a variable resistor Rx and a capacitor C in series and is connected through a generally closed timing switch S2 parallel with the electromagnet M1. The third transistor T3 is connected to a second electromagnet M2 in the lens unit parallel with the other electromagnet M1. The two transistors T, T2 constitute a Schmitt trigger circuit so that the current which flows through the second electromagnet circuit M2 is sharp.

Provision is made in the built-in circuits for connecting a flash device at a receptacle 15 on the camera body 2. A synchro-switch S3 generally open is provided in the built-in circuit of the lens unit for placing in circuit a flash device, not shown, when necessary for flash exposures.

The camera body is provided with four elongated electrical contacts 9 connected at four different points of the built-in circuit as illustrated in FIG. 3. These contacts are movably supported in insulator sleeves 8 and biased axially outwardly by respective springs 10 bearing against abutment surfaces in the camera body 2 and a collar on the elongated contacts as illustrated in FIG. 1. The contacts extend outwardly of a front face surface on the mount plate 1 so that hemispherical contact surfaces thereof make electrical contact with a set of individual electrical contacts 11 on the lens unit.

The set of electrical contacts in the lens unit 5 are equal in number to the contacts on the camera body and are connected at four different points of the built-in circuit of the lens unit as illustrated in FIG. 1. The two sets establish parallel connections between and in the built-in circuits. The lens unit contacts are mounted in insulating sleeves 12 and have hemispherical contact surfaces extending outwardly of a face of the lens unit ring plate 6 that fits over the mounting plate 1 of the camera body. The hemispherical contact surfaces of the lens unit contacts have less curvature and greater surface contact area on the curved surfaces than the set of contacts on the camera body. This insures positive physical contact between the contacting surfaces.

The lens unit is kept compact by limiting the components in the electrical circuitry to the two switches, the electromagnets and connecting circuitry therein as illustrated in FIG. 3. An electrically operated shutter 13 in the lens unit is mounted between the lens generally designated 14. The shutter need not be a between-the-lens shutter.

The lens unit 5 has its ring plate flanges inserted axially into the opening of the plate 1 and the unit is rotated angularly so that the flanges 4, 7 of the two mount ring plates 1, 6 are brought into angular correspondence and the lens unit is thus removably mounted on the camera body. When the lens unit has been rotated to its proper angular position and stopped at a stop, not shown, the two sets of electrical contacts are brought into correspondence and electrical connection is automatically established between the two built-in circuits.

The circuitry disclosed is well-known for controlling the exposure time of the electric shutter 13. When the camera release button or lever, not shown, is depressed the power switch S1 is closed to energize the electromagnet M1. When this electromagnet is energized the shutter begins to open and at the same time the timing switch S2 is opened. The opening of the timing switch S2 begins the charging of the capacitor C through the resistor $Rx$. When the charge voltage of the capacitor reaches a trigger level of the first transistor T1 it is rendered conductive by interaction with the second transistor T2 and the third transistor T3 is likewise rendered conductive so that an electric current is applied to the electromagnet M2. When this electromagnet is energized the shutter is closed to complete the photographic exposure.

The syncro-switch S3 is closed when the shutter is opened. If a flash unit is connected to the camera a flash exposure is taken. This switch is opened by closing of the shutter. The exposure time is varied by the resistance value of the variable resistor $Rx$. An arbitary exposure time can be obtained by selecting the resistance value of the resistor $Rx$ manually. Moreover, it is possible to sense the light and its intensity or brightness of a field or subject being photographed and automatically control the resistance value of a photoconductive element, for example a photoconductive cell, $Cds$, replacing the resistor $Rx$ thereby to automatically control the exposure time and make it correspond with the brightness of the subject matter being photographed.

Since the circuitry is divided into two built-in circuits the lens unit can be made simpler than heretofore possible. Electrical connection is automatically made as before described and a positive electrical connection is assured by the multiple electrical connections effected by the two sets of connectors or contacts.

Those skilled in the art will recognize that the bayonet-mounted lens unit on the camera body can be constructed with another suitable mount system. Moreover, it can be seen that the curvature of the contact surfaces of both sets of contacts allow angular rotation of the lens unit relative to the camera body when mounting the lens unit on the camera body and removing it therefrom. The contacts of the camera body are biased to a projected position but still the exchange of lenses is easily made. Furthermore, the greater area and lesser curvature of the lens unit contacts allows this easy exchange and insures positive contact between both sets of contacts.

What I claim and desire to secure by letters patent is:

1. A camera comprising, an interchangeable lens unit comprising a shutter and electromagnetic means for controlling actuation of said shutter, a camera body having an exposure aperture, an electric timing circuit in said camera body for timing exposures and controlling said electromagnetic means, mounting means on said camera body for removably and interchangeably mounting said lens unit in registry with said exposure aperture, said lens unit having bayonet mount means bayonet-stabbed into said mounting means for mounting therein, said bayonet means and said mounting means each including means coactive upon angular rotation of said lens unit relative to said mounting means to releasably lock the lens unit on said mounting means, a set of electrical contacts on said camera body mounting means connected to said timing circuit and another set of electrical contacts on said bayonet mount means of said lens unit connected to said electromagnetic means, said contacts on said mounting means and the contacts on said lens unit being angularly disposed for semi-automatically placing the two sets of electrical contacts in registry and electrically connecting said timing circuit and said electromagnetic means for timing exposures with said shutter when said lens unit is bayonet-stabbed into said mounting means and rotated to releasably lock it in said mounting means on said camera body.

2. A camera according to claim 1, in which the contacts of said camera body are elongated, means biasing each contact axially individually to a position in which it projects outwardly of surfaces on said camera body mounting means for engaging the contacts on said lens unit, and in which the contacts of the lens unit have contact surfaces extending outwardly of surfaces on said bayonet mount means, and said surfaces of said camera body and said bayonet mount means being disposed in opposed relationship when said lens unit is removably mounted on said camera body in position for taking a photographic exposure.

3. A camera according to claim 1, in which said both sets of contacts have hemispherical contact surfaces and the hemispherical contact surfaces of the contacts on said lens unit have less curvature and greater area than the hemispherical contact surfaces of the contacts on said camera body, means mounting the contacts of said camera body for movement to a retracted position and a projected position to make electrical contact with the contacts of said lens units, and means biasing each contact of said camera body individually to said projected position.

* * * * *